(12) United States Patent
Eshed et al.

(10) Patent No.: US 9,132,587 B2
(45) Date of Patent: Sep. 15, 2015

(54) SYSTEM AND METHOD FOR THREE DIMENSIONAL MODEL PRINTING

(75) Inventors: David Eshed, Kfar-Saba (IL); Eliahu M. Kritchman, Tel-Aviv (IL); Guy Menchik, RaAnana (IL)

(73) Assignee: Stratasys Ltd., Rehovot (IL)

( * ) Notice: Subject to any disclaimer, the term of this patent is extended or adjusted under 35 U.S.C. 154(b) by 1003 days.

(21) Appl. No.: 12/937,274

(22) PCT Filed: Apr. 10, 2008

(86) PCT No.: PCT/IL2008/000501
§ 371 (c)(1),
(2), (4) Date: Oct. 11, 2010

(87) PCT Pub. No.: WO2009/125381
PCT Pub. Date: Oct. 15, 2009

(65) Prior Publication Data
US 2011/0147993 A1    Jun. 23, 2011

(51) Int. Cl.
*B29C 67/00*    (2006.01)

(52) U.S. Cl.
CPC ......... *B29C 67/0059* (2013.01); *B29C 67/0085* (2013.01)

(58) Field of Classification Search
USPC .......................................................... 425/375
See application file for complete search history.

(56) References Cited

U.S. PATENT DOCUMENTS

| | | |
|---|---|---|
| 3,791,932 A | 2/1974 | Schuurs et al. |
| 3,839,153 A | 10/1974 | Schuurs et al. |
| 3,850,578 A | 11/1974 | McConnell |
| 3,850,752 A | 11/1974 | Schuurs et al. |
| 3,853,987 A | 12/1974 | Dreyer |
| 5,506,607 A * | 4/1996 | Sanders, Jr. et al. .............. 347/1 |
| 6,259,962 B1 | 7/2001 | Gothait |
| 6,305,769 B1 | 10/2001 | Thayer et al. |
| 6,936,212 B1 | 8/2005 | Crawford |
| 2003/0129191 A1 | 7/2003 | Theodore et al. |
| 2003/0165993 A1 | 9/2003 | Buechler et al. |

(Continued)

FOREIGN PATENT DOCUMENTS

| | | |
|---|---|---|
| CN | 1275944 | 12/2000 |
| EP | 1459870 | 9/2004 |

(Continued)

OTHER PUBLICATIONS

Communication Under Rule 71(3) EPC Dated Dec. 29, 2011 From the European Patent Office Re. Application No. 08738203.2.

(Continued)

*Primary Examiner* — Yogendra Gupta
*Assistant Examiner* — Kimberly A Stewart (57) ABSTRACT

A scanning 3-D printing system comprises a printing platform movable in a printing direction and in an indexing direction, the printing platform comprising a printing head configured for dispensing building material while the printing platform is moving in a printing direction one pass at a time, and layer by layer, a roller configured for leveling the dispensed building material one pass at a time, wherein the roller is rotatably mounted on a roller axle, and wherein the roller axle extends over all passes of the printing system and is stationary in the indexing direction, a scraper configured for scraping excess building material off the roller, and a trough configured for collecting the building material scraped off the roller.

6 Claims, 7 Drawing Sheets

(56) References Cited

U.S. PATENT DOCUMENTS

| | | | | |
|---|---|---|---|---|
| 2003/0209836 A1* | 11/2003 | Sherwood | | 264/401 |
| 2003/0223994 A1 | 12/2003 | Hoogenboom et al. | | |
| 2004/0191260 A1 | 9/2004 | Reiter et al. | | |
| 2005/0104241 A1 | 5/2005 | Kritchman et al. | | |
| 2005/0152912 A1 | 7/2005 | Reiter et al. | | |
| 2005/0250833 A1 | 11/2005 | Attali et al. | | |
| 2005/0255101 A1 | 11/2005 | Reiter et al. | | |
| 2005/0287141 A1 | 12/2005 | Reiter | | |
| 2006/0083735 A1 | 4/2006 | Reiter et al. | | |
| 2007/0057412 A1* | 3/2007 | Weiskopf et al. | | 264/497 |
| 2007/0196369 A1 | 8/2007 | Hoogenboom et al. | | |
| 2008/0241404 A1* | 10/2008 | Allaman et al. | | 427/333 |

FOREIGN PATENT DOCUMENTS

| | | | | |
|---|---|---|---|---|
| EP | 1847377 | 10/2007 | | |
| GB | 2311960 | 10/1997 | | |
| WO | WO 96/12607 | 5/1996 | | |
| WO | WO 2004/096527 | 11/2004 | | |
| WO | 2007/039450 | * 12/2007 | | B29C 67/00 |
| WO | WO 2009/125381 | 10/2009 | | |

OTHER PUBLICATIONS

Response Dated Sep. 11, 2011 to Communication Pursuant to Article 94(3) EPC of May 26, 2011 From the European Patent Office Re. Application No. 08738203.2.
Translation of Decision on Rejection Dated Aug. 9, 2013 From the State Intellectual Property Office of the People's Republic of China Re. Application No. 200880129815.2.
Communication Pursuant to Article 94(3) EPC Dated May 26, 2011 From the European Patent Office Re. Application No. 08738203.2.
International Preliminary Report on Patentability Dated Oct. 12, 2010 From the International Bureau of WIPO Re. Application No. PCT/IL2008/000501.
International Search Report and the Written Opinion Dated Sep. 29, 2009 From the International Searching Authority Re.: Application No. PCT/IL2008/000501.
Communication Pursuant to Article 94(3) EPC Dated May 24, 2013 From the European Patent Office Re. Application No. 12170425.8.
European Search Report Dated Apr. 24, 2013 From the European Patent Office Re. Application No. 12170425.8.
Communication Under Rule 71(3) EPC Dated Apr. 10, 2014 From the European Patent Office Re. Application No. 13170133.6.
Communication Pursuant to Rules 161(1) and 162 EPC Dated Nov. 18, 2010 From the European Patent Office Re. Application No. 08738203.2.
Response Dated Dec. 15, 2010 to Communication Pursuant to Rules 161(1) and 162 EPC of Nov. 18, 2010 From the European Patent Office Re. Application No. 08738203.2.
European Search Report Dated Jul. 15, 2013 From the European Patent Office Re. Application No. 13170133.6.
Translation of Office Action Dated Nov. 5, 2012 From the State Intellectual Property Office of the People's Republic of China Re. Application No. 200880129815.2.
Communciation Pursuant to Article 94(3) EPC Dated Aug. 21, 2013 From the European Patent Office Re. Application No. 13170133.6.

* cited by examiner

SYSTEM AND METHOD FOR THREE DIMENSIONAL MODEL PRINTING

RELATED APPLICATIONS

This Application is a National Phase of PCT Patent Application No. PCT/IL2008/000501 having International filing date of Apr. 10, 2008. The contents of the above Application is incorporated herein by reference.

FIELD OF THE INVENTION

The present invention, in some embodiments thereof, relates to the field of Solid Freeform Fabrication (SFF) and more particularly but not exclusively to raster scanning three-dimensional (3-D) printing systems.

BACKGROUND OF THE INVENTION

Solid freeform fabrication (SFF) is a known technique for manufacturing solid objects, for example by the delivery of material and optionally energy to specified points in space to produce the solid object. Typically, the object is built in layers corresponding to virtual cross sections of the object from a CAD model.

One of the methods for SFF includes 3-D printing.

In U.S. Pat. No. 6,259,962 entitled "Apparatus and method for three dimensional printing", assigned to the common assignee and incorporated herein by reference in its entirety, describes an apparatus and a method for 3-D model printing. U.S. Pat. No. 6,259,962 describes an apparatus including a printing head having a plurality of nozzles, a dispenser connected to the printing head for selectively dispensing interface material in layers and curing means for optionally curing each of the layers deposited. The depth of each deposited layer is controllable, by selectively adjusting the output from each of the plurality of nozzles.

Typically, the 3-D object is formed on a tray, which may be movable in at least a direction perpendicular to the building plane (Z direction). To reduce cost and maintenance expenses, some systems as described for example in U.S. Pat. No. 6,259,962, include a printing head with dimensions that are shorter than the dimensions of the tray or object and performs sequential raster scanning of the tray, one pass after the other, to form each of the layers.

U.S. Patent Application Publication No. 20050104241, entitled "Apparatus and method for three dimensional model printing" assigned to the common assignee and incorporated by reference in its entirety, describes an object correcting apparatus to alter the thickness of a layer of the dispensed material to a pre-determined height. The object correcting apparatus may include, for example, a roller and a cleaning apparatus to remove material from the roller. The roller may operate at selected speeds and directions, and may be heated and/or cooled, to help in effectively altering dispensed material.

According to embodiments described in U.S. Pat. No. 6,850,334 and U.S. Patent Application Publication No. 20050104241, the 3-D printing systems may include a printing head having a dispensing unit with a plurality of nozzles through which material may be selectively dispensed, a roller unit for removing surplus material from each layer and a curing unit for curing the interface material of each layer to form the 3-D object. The roller unit may include a roller for leveling the material as well as a scraper and trough for scraping and collecting excess building material off the roller. The roller unit in this case is conformed to the dimensions of the printing head.

Typically, the printing head may be movably supported on a plane parallel to the building plane. The printing head is advanced along a printing direction (X direction) to print each pass and then shifted along an indexing direction (Y direction) to print subsequent passes, substantially on the same plane. The roller is rotatably engaged on the printing head such that its longitudinal axis is parallel to the indexing direction and rotates in a direction "opposite" to the direction of printing due to the friction between the roller and the surface. Typically, a motor engaged on the roller, facilitates rotation of the roller.

Typically during raster scanning printing, the printing head dispenses material over a pass, levels that pass with the roller to remove any surplus material over that pass, and then cures that pass. This process is repeated for each pass and over all the layers until the 3-D objects are completed.

SUMMARY OF THE INVENTION

An aspect of some embodiments of the present invention is the provision of a raster scanning 3-D printing system that provides seamless leveling between adjacent passes in a printing layer.

An aspect of some embodiments of the present invention, is the provision of a raster scanning 3-D printing system comprising a printing platform movable in a printing direction and in an indexing direction, the printing platform comprising a printing head configured for dispensing building material while the printing platform is moving in a printing direction one pass at a time, and layer by layer, a roller configured for leveling the dispensed building material one pass at a time, wherein the roller is rotatably mounted on a roller axle, and wherein the roller axle extends over all passes of the printing system and is stationary in the indexing direction, a scraper configured for scraping excess building material off the roller, and a trough configured for collecting the building material scraped off the roller.

Optionally, the roller axle is supported on a Y rail aligned with the indexing direction, wherein the Y rail is mounted at each end to a carriage, wherein the carriage is configured to support and couple the Y rail on each of its ends to an X rail aligned with the printing direction.

Optionally, the carriage is movable in the printing direction.

Optionally, the roller extends over all passes of the printing system and is stationary in the indexing direction.

Optionally, the scraper is movable in the indexing direction.

Optionally, the scraper is mounted on the printing platform.

Optionally, the trough is movable in the indexing direction.

Optionally, the trough is mounted on the printing platform.

Optionally, the printing platform is configured for offsetting the scraper's position in the indexing direction for printing different layers.

Optionally, the scraper and the trough extend over the entire length of the roller axle and are stationary in the indexing direction.

Optionally, the system comprises at least two conduits distributed along the trough and configured for removing the building material collected in the trough.

Optionally, comprises a pump configured for pumping off the building material collected in the trough, wherein the building material is pumped out of the trough from above the trough.

Optionally, a tray configured for supporting the dispensed building material at a defined height, wherein the tray is movable in a vertical direction, wherein the vertical direction is perpendicular to the printing direction and the indexing direction.

An aspect of some embodiments of the present invention is the provision of a method for printing 3-D objects with a raster scanning 3-D printing system, the method comprising dispensing building material from a printing platform while moving in a printing direction one pass at a time and layer by layer, shifting the printing platform in an indexing direction prior to dispensing a subsequent pass of a layer, and leveling the building material after each dispensing with a roller, wherein the roller is rotatably mounted on a roller axle, and wherein the roller axle extends over all passes of the printing system, is stationary in the indexing direction and is movable in the printing direction.

Optionally, the method comprises shifting the roller in the indexing direction after leveling a pass in a layer.

Optionally, the roller extends over all printed passes of the printing system.

Optionally, the method comprises at least one of a scraper configured for scraping excess building.

Optionally, the roller and a trough configured for collecting the building material scraped off the roller are mounted on the printing platform.

Optionally, the method comprises scraping excess building material off the roller with the scraper, and shifting the scraper in the indexing direction after leveling a pass in a layer.

Optionally, the method comprises offsetting the scraper's position in the indexing direction for printing different layers.

Optionally, the method comprises collecting the building material scraped off the roller into the trough, and shifting the trough in the indexing direction after leveling a pass in a layer.

Optionally, the method comprises removing the building material collected in the trough from at least two positions along a length of the trough.

Optionally, the method comprises pumping the building material collected in the trough from above the trough.

Optionally, the printing platform, the roller, the scraper and the trough move together in the printing direction while dispensing the building material.

Optionally, the method comprises increasing the space between the printing platform and a tray on which the object is printed prior to printing a subsequent layer.

An aspect of some embodiments of the present invention is the provision of a raster scanning 3-D printing system comprising a printing platform mounted on a Y rail movable in a printing direction and in an indexing direction, the printing platform comprising a printing head configured for dispensing building material while moving in a printing direction one pass at a time, and layer by layer, a roller configured for leveling the dispensed building material one pass at a time, a scraper configured for scraping excess building material off the roller, and a trough configured for collecting the building material scraped off the roller, wherein the printing platform moves in the indexing direction along the Y rail, and wherein both the Y rail and the roller extend over all passes of the printing system and are stationary in the indexing direction.

Optionally, at least one of the scraper and the trough are movable in the indexing direction.

Optionally, at least one of the scraper and the trough extend over all passes of the printing system and are stationary in the indexing direction.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are described herein by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to SFF systems and more particularly but not exclusively to raster scanning 3-D printing systems. The inventors have found that during raster scanning of multiple passes in a printed layer, inconsistencies in the leveling of the passes may occur, resulting in ridges forming at the borders between passes. Typically the ridges form due to inaccurate alignment of the roller with respect to the tray such that the roller is not parallel to the tray. Adjusting the roller to maintain a parallel alignment between the roller and the tray is typically a cumbersome and time consuming procedure.

Figure 1:
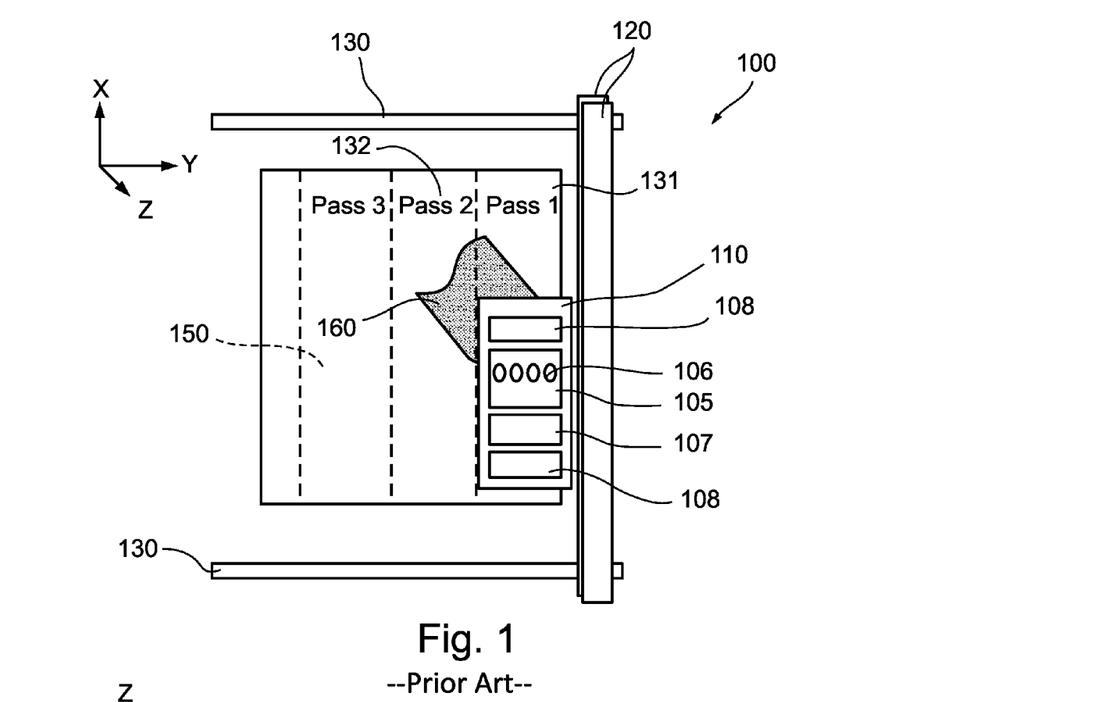
FIG. 1 is a schematic illustration of a known 3-D printing system including a printing platform supported by a two rail system, one rail above the other.
Figure 2:
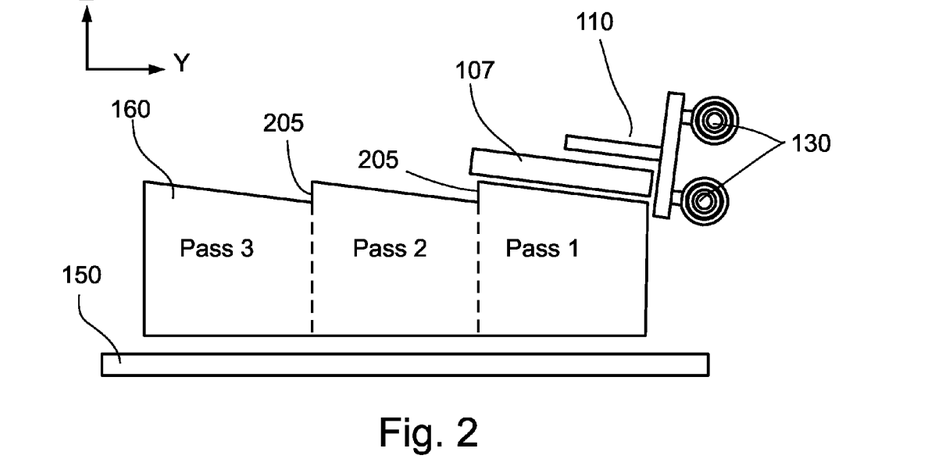
FIG. 2 is a schematic illustration of ridges formed on the 3-D printed object due to misalignment between a roller on a printing platform and a tray.

For purposes of better understanding some embodiments of the present invention, as illustrated in FIGS. 3-8 of the drawings, reference is first made to the construction and operation of a known printing system as illustrated in FIGS. 1 and 2. It is noted that while the prior art system is known, the present inventors have discovered the source of the problem described below as well as the methodology of solving it.

Reference is now made to FIG. 1 showing schematic illustration of a known printing system including a printing platform supported by a two rail system on one end of the printing platform. Known printing system 100 typically includes printing platform 110 supported on a two X rail system 120, one rail above the other in the Z direction. Printing platform 110 including the roller unit 107 is typically supported only on one end by two rail system 120 aligned with the printing direction (X direction). The two rail system, one over the other, serves to increase the stability and stiffness of the printing platform and its components in the vertical direction (Z direction). While printing, the printing platform advances along a printing direction (X direction) as it dispenses material from printing head(s) 105 via one or more printing nozzles 106, levels the dispensed layer with roller unit 107 and cures it with one or more curing lamps 108.

Upon completion of a first pass 131, the printing platform together with its supporting rail system 120 is shifted along the Y rails 130 in the indexing direction (Y direction) to print a subsequent pass 132 and continues until completing a layer of the object 160. One or more motors may be used to control motion of the printing platform and/or the two rail system along an area defined by a tray 150 supporting the printed object 160.

Typically, tray 150 is movable in the vertical direction (Z direction). One or more motors may be used to control motion of the tray and adjust its height for each layer being printed. For example, at an initial state the tray may be positioned closest to the printing platform and after each layer printed the tray may be lowered in the Z direction a predefined distance with respect to the printing platform, to accommodate printing of the subsequent layer.

Typically, each printed layer is accompanied by an offset of the printing head in the indexing direction (Y direction). This offset and/or shift facilitates preventing accumulation of defects in a specific area that may be brought about by defective nozzles, from layer to layer. This technique is typically referred to as nozzle scatter technique and is described in greater detail in incorporated U.S. Pat. No. 6,259,962.

The inventors have found that stability and stiffness in the vertical direction (Z direction) with respect to the tray is critical in assuring proper leveling of the layer. When the stability and stiffness of the roller is not sufficient, roller oscillations in the Z direction may appear during printing. Oscillations may result in a wavy appearance of the top surface of the layer along the printing direction (Z direction), and when strong oscillations occur, printing may automatically or manually be halted. Strong oscillations are typically triggered by fluctuating forces that the wavy layer may exert on the roller. The inventors have found that although the printing platform is firmly attached to the two rail system, and the rails are hard, the structure is not sufficiently stable and stiff. Particularly, the opposite longitudinal end of the roller which is not attached to the two rail system is not stable.

Reference is now made to FIG. 2 showing a schematic illustration of ridges formed on the printed object due to misalignment between a roller and/or printing platform and a tray. Although roller 107 should be parallel to Y rails 130 and tray 150, the printing platform 110 and hence the roller tends to tilt, resulting in protrusions and/or ridges 205 where each protrusion or ridge corresponds to one pass e.g. pass 131, pass 132, pass 133. The adjustment procedure to realign the printing platform so that the roller remains parallel to the Y rails and tray 150 may be cumbersome and difficult.

According to some embodiments of the present invention, the 3-D printing system includes a roller supported on two opposite ends with one or more rails. The inventors have found that by replacing the known two rails, one above the other to support the printing platform on one end, with one or more single rails supporting the printing head and/or roller on two opposite ends increases stability and stiffness of the roller. The inventors have also found that supporting the printing platform and/or roller from two opposite ends provides consistent vertical alignment between the tray and the roller and thus avoids formations of ridges between passes. If formation of ridges may be avoided in this manner, the previous requirement for a high degree of parallel alignment between the roller and the tray is prevented. According to some embodiments of the present invention, consistent vertical alignment between the tray and the roller is achieved by maintaining a single axis about which the roller is rotated for all passes. The inventors have found that consistent vertical alignment between the tray and the roller may be achieved by supporting the roller on an axle extending over the entire tray and supporting the axle on both ends. In some exemplary embodiments, the roller is rotatably mounted on a roller axle such that the roller axle extends over the entire tray and is supported on both ends. In some exemplary embodiments, the roller extends over the entire tray and is physically held by two bearings at both ends of the roller, wherein the bearings are centered at the roller axis and are held by respective carriages.

Typically the printing platform is movable along the one or more rails supporting the printing platform, and the one or more rails supporting the printing platform is movable along the two additional rails coupled to it in a perpendicular direction, so that movement in two dimensions (X and Y) may be easily achieved.

According to some embodiments of the present invention, the rail system includes one rail aligned with the indexing direction to support the printing platform. In some exemplary embodiments, the roller unit is directly supported by the rail aligned with the indexing direction and that rail is coupled on each end to a rail aligned with the printing direction. In some embodiments of the present invention the roller unit is extended over a dimension of the tray, e.g. width or length of the tray, providing substantially consistent leveling over all passes in a layer. In some exemplary embodiment, the roller is extended over a dimension of the tray, while the scraper and/or waste trough is maintained over a width of a single pass and is advanced with the printing platform to each additional printing pass.

According to some embodiments of the present invention, the roller unit is supported on the printing platform and the printing platform is supported on two rails, each one at an opposite end of the printing platform. In some exemplary embodiments, the printing platform is supported on two rails aligned in the indexing direction. In other embodiments of the present invention, the printing platform is supported on two rails aligned in the printing direction.

According to some embodiments of the present invention, the size of the 3-D printing system is reduced by eliminating a requirement for a double rail support on one end of the printing head. In some exemplary embodiments, the height of the 3-D printing system is reduced.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 3:
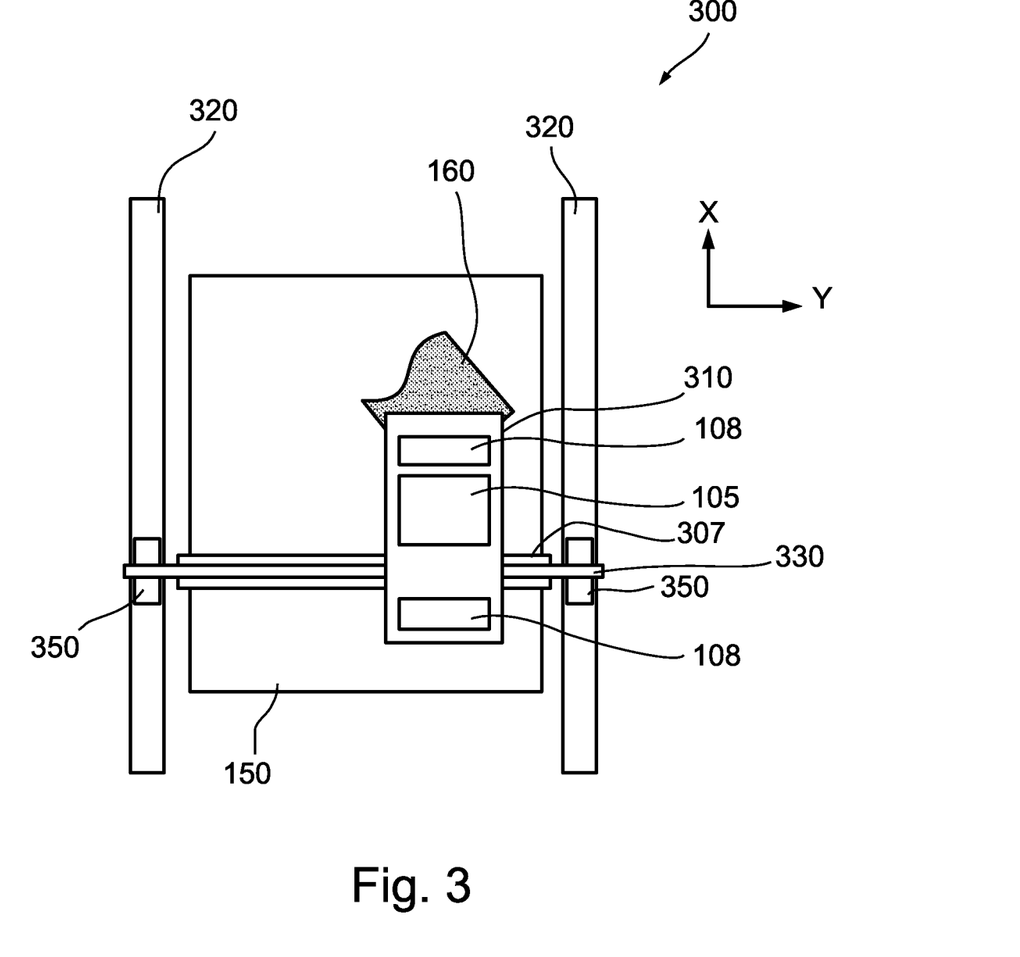
FIG. 3 is a schematic illustration of a 3-D printing system including a roller that extends along a dimension of the tray according to some embodiments of the present invention.

Reference is now made to FIG. 3 showing a schematic illustration of a printing system including a roller that extends along the length of the tray according to some embodiments of the present invention. The present inventors have found that although proper leveling of the layers is sensitive to misalignment of the printing platform with the tray, other printing activities such as curing and dispensing are less sensitive to misalignment. According to some embodiments of the present invention, a roller 307 is as long in the Y direction and/or indexing direction as required for covering the Y dimension of tray 150 and/or object 160.

In some exemplary embodiments, roller 307 and printing platform 310 are supported on Y rail, while Y rail 330 is coupled on both ends to X rails 320. In some embodiments of the present invention, roller 307 is held by two bearings at both ends of the roller, wherein the bearings are centered at the roller longitudinal axis. According to some embodiments of the present invention, printing platform 310 is mounted on Y rail 330 using any of various methods and devices known in the art so that the printing platform is supported and moveable along Y rail 330. Any of various motors and/or actuators and devices for their control known in the art may be used to move and accurately control motion of printing platform 310 along Y rail 330. In some exemplary embodiments, roller 307 is supported on its longitudinal axis so that it is rotatable. In some exemplary embodiments, rotation of roller 307 is provided by a motor.

The Y rail 330 is mounted at both ends to a carriage 350 which supports the Y rail and couples it to two X rails 320 on both ends of Y rail 330 so that the Y rail may be moved along the X rails. Any of various motors and/or actuators and devices for their control known in the art may be used to move and control motion of carriages along the X rails, e.g. a step motor with a linear encoder may be used and/or piezoelectric motor.

According to some embodiments of the present invention, a system 300 equipped with roller 307 extending over the length of the tray and supported on both of its ends facilitates consistent leveling across passes of a layer e.g. passes 131, 132, etc., as well as a sufficiently stable and stiff structure. In exemplary embodiments of the present invention, the structure of printing system 300 does not require periodic adjustment of the alignment between the printing platform and the tray or supporting rails to maintain acceptable alignment between the roller and the tray or supporting axis. In fact, a high requirement to maintain parallel alignment is not required for roller 307, since the roller is not shifted in the indexing direction from pass to pass. Therefore, even if the roller is positioned at an angle with respect to the tray, ridges 205 (FIG. 2) may not be formed on borders between passes due to leveling by the roller.

Figure 4A:
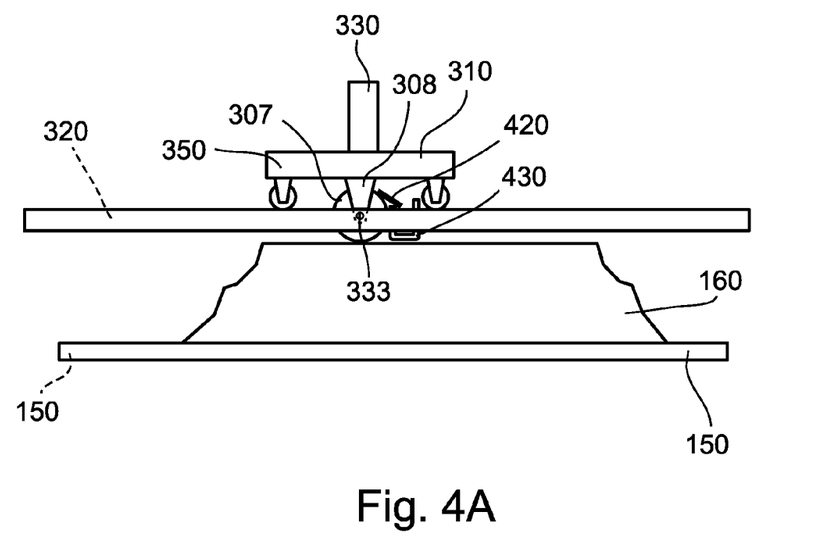
FIG. 4A is a schematic illustration of a roller unit including a roller, a scraper and a waste collection trough according to some embodiments of the present invention.
Figure 4B:
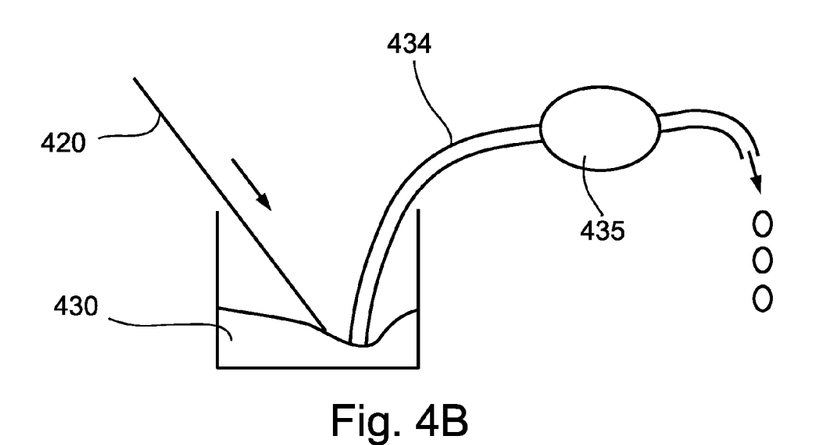
FIG. 4B is a schematic illustration of a waste disposal unit including a scraper, waste collection trough, waste pipe and waste pump according to embodiments of the present invention.

Reference is now made to FIGS. 4A and 4B showing a schematic illustration of a roller unit including a scraper and a waste collection trough according to some embodiments of the present invention. According to some embodiments of the present invention, roller 307 is rotatably mounted on a roller axle 333. In some exemplary embodiments of the present invention, roller axle 333 is supported on both ends to carriage 350 or Y rail 330 using a bearing 308 on each end of the roller axle. In some exemplary embodiments, the roller axle is not required and the bearings are centered at the roller's longitudinal axis.

Typically, a scraping blade 420 is implemented to scrape clean roller 307 of excess printing material which the roller accumulates while leveling the printed layers. The scraped material is typically collected by collection trough 430. Typically, the trough is very close to the upper surface of the printed object and therefore a gravitational drain of the waste from the trough may not be possible and/or practical. According to embodiments of the present invention a pump 435 is used to pump off the waste in upward direction via a waste pipe 434. The pumped waste is collected in a waste container. According to some embodiments of the present invention, the waste collection trough 430 and scraping blade 420 associated with roller 307 may be extended along the length of roller 307, e.g. the roller unit may be extended over the length of the tray. As such the length of roller corresponding to the summation of the widths of all the passes is scraped when leveling each of the passes.

Figure 5A:
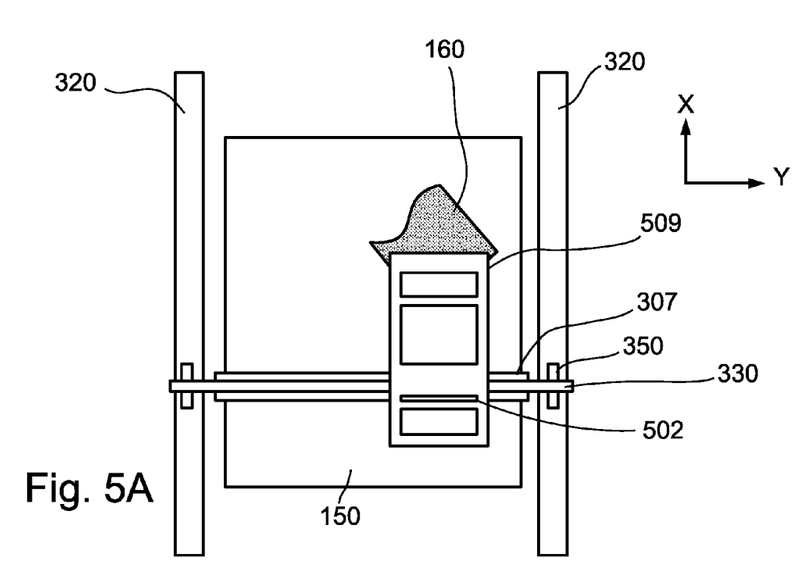
FIG. 5A is a schematic illustration of a 3-D printing system including a scraping blade that extends over one pass and a roller that extends over a dimension of a tray according to some embodiments of the present invention.

Reference is now made to FIG. 5A showing a schematic illustration of a printing system including a scraping blade that covers one pass and a roller that extends over the width of the tray according to some embodiments of the present invention. According to some embodiments of the present invention, scraping blade 502 of the roller unit may be confined and/or reduced to a width corresponding to the width of a single pass and/or the width of the printing platform 509 and may be shifted from pass to pass together with the printing platform to clear material leveled a single pass and/or to scrap material off the roller over a length less than the entire length of the roller. In some exemplary embodiments, the waste collection trough extends over the length of the roller and the waste collection trough and roller are not shifted in the indexing direction with printing platform 509.

Typically, the scraping blade is pressed tightly to the roller, inducing frictional torque on the roller. The length of the scraping blade directly affects the torque generated on the roller. The present inventors have found that by reducing and/or minimizing the length of the blade, the cost of the blade as well as cost and size of the roller motor required may be reduced.

Typically the quality of the blade tends to deteriorate, e.g. becomes scratched from over use due to continuous frictional contact with the rotating roller. This may occur even when the blade is made of a tough material such as stainless steel. Scratches on the blade may lead to small amounts of printing material passing under the blade and remaining on the roller. Printing quality typically deteriorates as a result of material left on the roller. Typically, due to over use, the blade may need to be replaced. In some exemplary embodiments, a shorter blade may facilitate reducing maintenance costs when replacing the blade.

According to some embodiments of the present invention, it may be advantageous to use a short waste collection trough, e.g. extending over one pass. Typically, the wasted collected in the trough does not easily flow. A long trough extending over the width of a layer and/or tray may require 2-3 or more waste pumps to pump the waste from the trough at 2-3 or more points along the indexing direction. In some exemplary embodiments, the waste collection trough is confined to a width corresponding to a single pass and/or to the width of the blade and is shifted along the indexing direction together with printing platform 310. In some exemplary embodiments both the scraping blade and trough are confined to the width corresponding to a single pass and are shifted with the printing platform from pass to pass.

According to embodiments of the present invention, the nozzle scattering technique may be applied to scraper 420 so that the scraper may be offset together with printing head 108 in the indexing direction when printing different layers. The inventors have found that defects on the scraper, e.g. scratches on the scraper edge, may lead to slight defects, i.e., negligible defects, in a printed layer. However, when printing multiple layers, the defects may accumulate and become significant. By facilitating offsetting of the scraper in the indexing direction for different printed layers, the accumulated effect of defects in leveling may be avoided.

The inventors have also found that by facilitating relative motion between the scraper and the roller for different layers, wear on the roller due to defects on the scraper may be more evenly distributed along the roller. Such motion may avoid formation of scratches on the roller in discrete locations over time and/or operation of the printer.

Figure 5B:
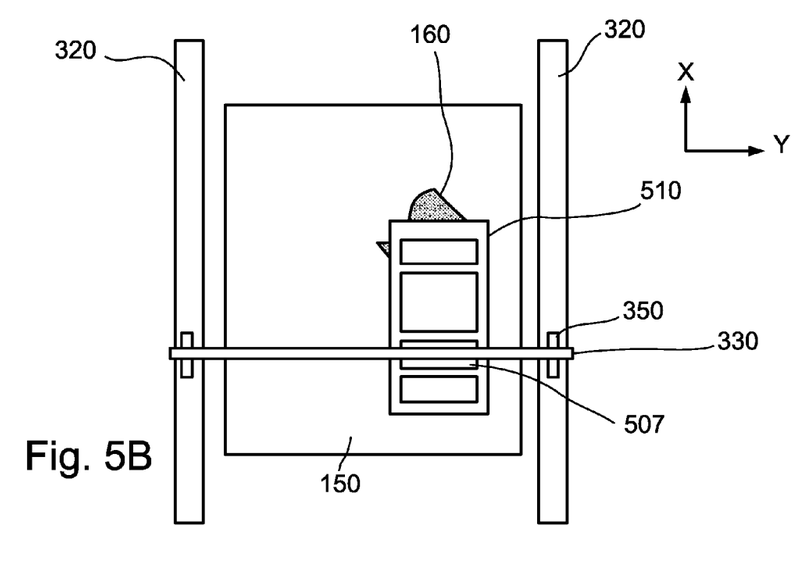
FIG. 5B is a schematic illustration of a 3-D printing system including a roller having a length that covers one pass and is rotatably supported on an axle that extends over a dimension of a tray according to some embodiments of the present invention.

Reference is now made to FIG. 5B a schematic illustration of a printing system including a roller having a length that covers one pass and rotatably supported on a roller axle that extends over the width of the tray according to some embodiments of the present invention. According to some embodiments of the present invention, printing platform 510 and roller 507, e.g. roller axle, are supported on Y rail 330 using any of various methods and devices known in the art so that the printing platform and roller 507 are supported and moveable along Y rail 330. Roller axle 333 (FIG. 4A) is supported on both ends to carriage 350 or Y rail 330 and runs parallel to Y rail 330. The Y rail 330 is mounted at both ends to a carriage 350 which supports the Y rail and couples it to two X rails 320 on both ends of Y rail 330 so that the Y rail may be moved along the X rails. According to embodiments of the present invention, Y rail 330 is aligned perpendicular to the X rail.

Typically, three conditions should be met in order to facilitate a consistent leveling surface over all passes of each layer: a. Roller 507 is engaged on Y rail 330 supported on both ends, in a way that the roller is precisely parallel to Y rail with respect to the vertical direction (Z axis), b. Rail Y is rigid with respect to bending in Z direction, and c. Y rail 330 is supported on two X rails at both ends of the Y rail. According to embodiments of the present invention, even if Y rail 330 is not precisely perpendicular to X rail or to Z rail (Z rail is the rail along which the tray moves) or to the surface of the tray, said consistency of leveling surface over all passes is maintained.

Figure 5C:
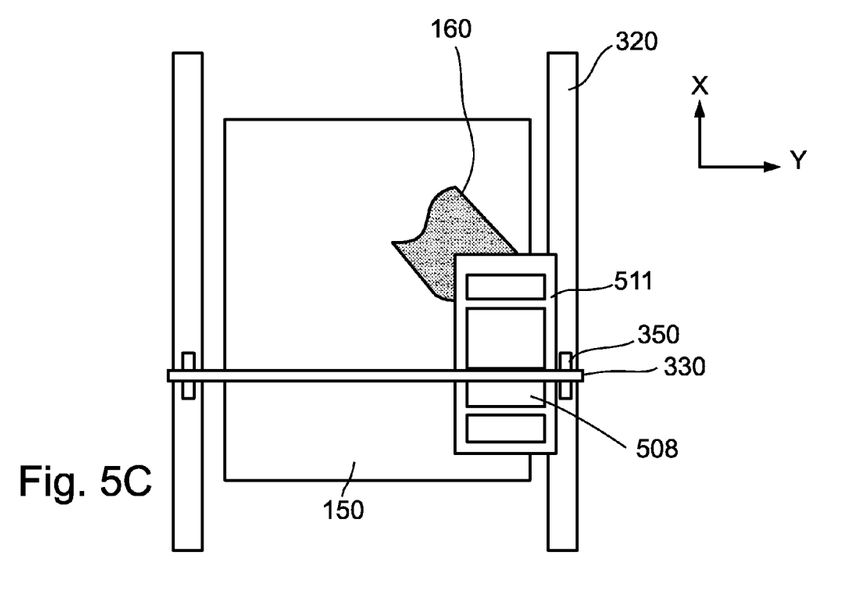
FIG. 5C is a schematic illustration of a 3-D printing system including a roller having a length that covers one pass engaged on a printing platform that is supported on a rail that extends over a dimension of a tray according to some embodiments of the present invention.

Reference is now made to FIG. 5C showing a schematic illustration of a printing system including a roller having a length that covers one pass engaged on a printing platform that is supported on a rail that extends over the width of the tray according to some embodiments of the present invention. According to some embodiments of the present invention, roller 508 is supported on printing platform 511. According to embodiments of the present invention, printing platform 511 is supported on Y rail 330 using any of various methods and devices known in the art so that the printing platform is supported and moveable along Y rail 330. The Y rail 330 is mounted at both ends to a carriage 350 which supports the Y rail and couples it to two X rails 320 on both ends of Y rail 330 so that the Y rail may be moved along the X rails. According to embodiments of the present invention, Y rail 330 is aligned in the Y axis so that it is parallel to the Y axis. According to some embodiments of the present invention, roller 508 engaged on printing platform 511 which in turn is supported on Y rail 330, facilitates maintaining a consistent leveling surface over all passes of each layer, even if Y rail is held at a slight angle with respect to the vertical direction (Z axis). The configuration depicted in FIG. 5C provides similar stability, stiffness, and leveling performance as described in reference to FIG. 5B. In some exemplary embodiments of the present invention, printing platform 511 is supported on the Y rail along the width of the printing platform to provide stability and stiffness to the structure.

Figure 6:
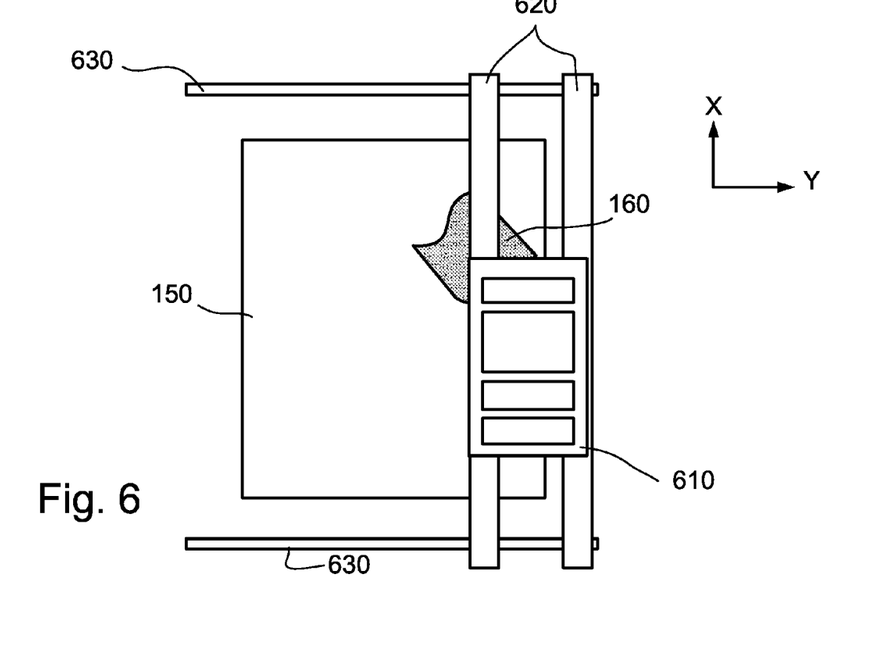
FIG. 6 is a schematic illustration of a 3-D printing system including a printing platform supported on opposite ends by rails aligned with the printing direction according to some embodiments of the present invention.
Figure 7:
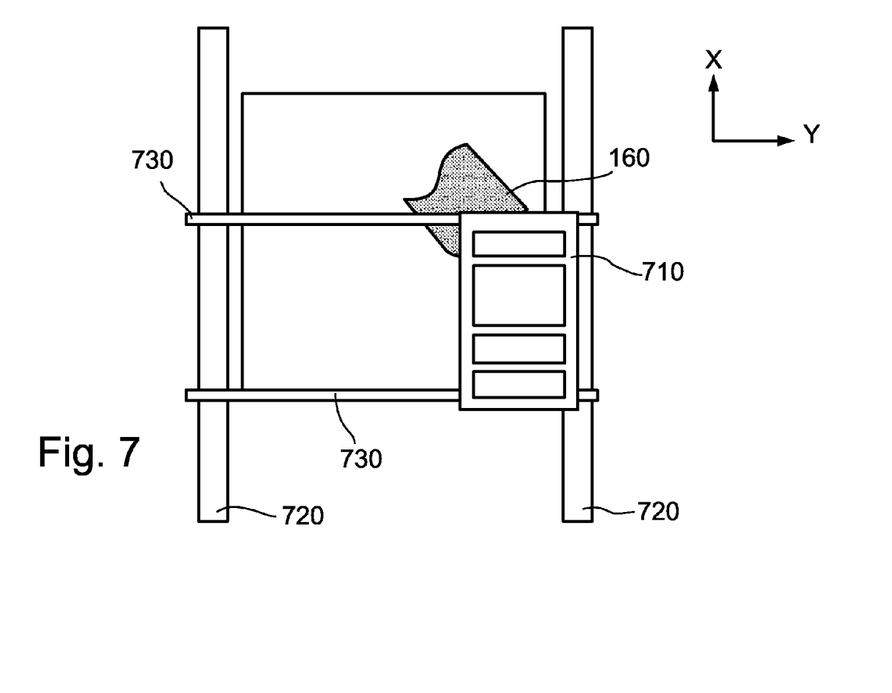
FIG. 7 is a schematic illustration of a 3-D printing system including a printing platform supported on opposite ends by rails aligned with the indexing direction according to some embodiments of the present invention.

Reference is now made to FIGS. 6 and 7 showing additional configurations for a printing system including two rails supporting the printing platform from opposite ends, according to some embodiments of the present invention. In FIG. 6, printing platform 610 is supported by two X rails 620 on each side of platform 610. The X rails 620 are mounted at both ends to carriages which support the X rails and couples them to two Y rails 630 at both ends of X rails 620 so that the X rails may be moved along the Y rails.

In FIG. 7 printing platform 710 is supported by two Y rails 730 at opposite ends of platform 710. The Y rails 730 are mounted at both ends to carriages which support the Y rails and couple them to two X rails 720 at both ends of Y rails 730, so that the Y rails may be moved along the X rails.

According to embodiments of the present invention, additional stability is achieved by adding an additional rail on an opposite end of the printing platform, so that additional stability is added to the entire printing platform and not only to the roller. According to embodiments of the present invention, improved stability and stiffness to the entire printing platform is provided by implementing a rail system with 4 rails (FIGS. 6 & 7). According to other embodiments of the present invention, improved stability and steadiness of the roller is provided with a rail system including 3 rails (FIGS. 3-5).

According to embodiments of the present invention, there is provided a shallower and more compact design of the printing system with added stability as compared to prior art systems. According to embodiments of the present invention, a shallower and more compact design is provided by replacing the two rail system, one rail above the other in the Z direction by a single rail system. In other exemplary embodiments, a shallower more compact design is provided by replacing the two rail system, one rail above the other in the Z direction by a two rail system on either end of the printing platform. In some exemplary embodiments, the printing systems described herein provide a relative height of the rails in the vertical direction (Z direction) that is lower than other known systems.

Figure 8A:
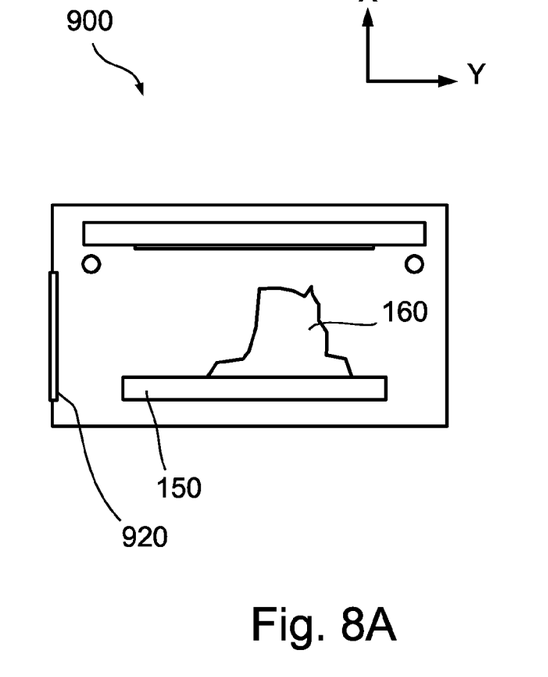
FIGS. 8A and 8B are schematic illustrations of a casing for a 3-D printing system including options for doors in the casing according to embodiments of the present invention.
Figure 8B:
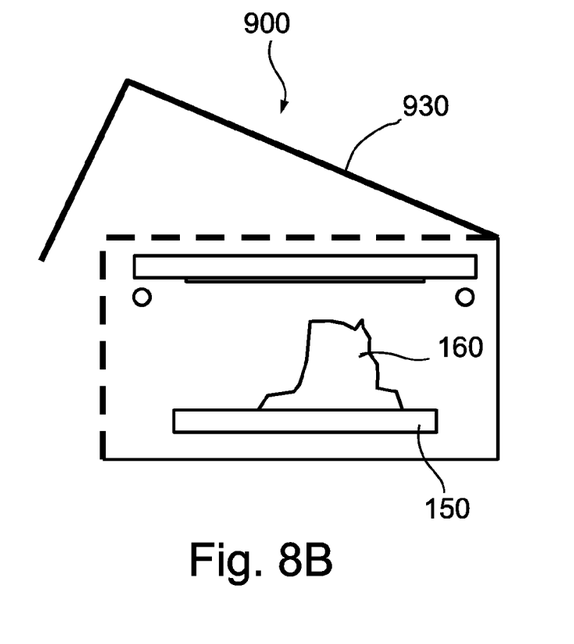

Reference is now made to FIGS. 8A and 8B showing schematic illustrations of casings for a printing system including options for doors in the casing according to embodiments of the present invention. According to embodiments of the present invention, object 160 may be removed form the casing 900 when the tray 150 is positioned at its lowest Z point. In some embodiments of the present invention, door 920 may be positioned on one side of the casing and the object may be removed sideways (FIG. 9A). In some exemplary embodiments, the door may be positioned at a lower level of the casing. According to other embodiments of the present invention, door 930 may be further extended to include also a top cover (FIG. 9B) so that two surfaces of the casing are lifted to remove the object, e.g. with a hinge on an upper surface of the casing. In some exemplary embodiments of the present invention, this design may provide more accessibility to the object and printing system and may be useful when maintenance is required.

The terms "comprises", "comprising", "includes", "including", "having" and their conjugates mean "including but not limited to".

The term consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A scanning 3-D printing system comprising:
   a printing platform movable in a printing direction and in an indexing direction, the printing platform comprising a printing head configured for dispensing building material while the printing platform is moving in a printing direction one pass at a time, and layer by layer, and for shifting in the indexing direction prior to dispensing a subsequent pass of a layer, wherein at least one layer includes multiple passes;
   a roller configured for accumulating excess dispensed building material in a current printed pass of a layer prior to printing an additional pass of that layer, wherein the roller is rotatably mounted on a Y rail and both the roller and the Y rail extend over all passes of the printing system and are stationary in the indexing direction;
   a scraper configured for scraping excess building material off the roller; and
   a trough configured for collecting the building material scraped of the roller, wherein at least one of the scraper and the trough extends over all passes of the printing system and is stationary in the indexing direction.

2. The system according to claim 1, wherein the Y rail is mounted at each end to a carriage movable in the printing direction, wherein the carriage is configured to support and couple the Y rail on each of its ends to an X rail aligned with the printing direction.

3. The system according to claim 1, wherein the scraper is mounted on the printing platform.

4. The system according to claim 2, wherein the printing platform is mounted on the Y rail.

5. The system according to claim 1, where the printing platform and the roller move together in the printing direction while dispensing the building material from the printing head.

6. The system of claim 1, wherein the scraper and the trough are configured to move together with the roller in the printing direction while the roller accumulates the excess dispensed building material from the printed pass.

* * * * *